(12) United States Patent
Cramer

(10) Patent No.: US 8,047,022 B2
(45) Date of Patent: *Nov. 1, 2011

(54) APPARATUS FOR OPENING AND CLOSING MOLDS IN A GLASSWARE FORMING MACHINE

(75) Inventor: Jeffrey W. Cramer, Liberty Center, OH (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 298 days.

This patent is subject to a terminal disclaimer.

(21) Appl. No.: 12/229,626

(22) Filed: Aug. 26, 2008

(65) Prior Publication Data

US 2009/0000337 A1    Jan. 1, 2009

Related U.S. Application Data

(63) Continuation-in-part of application No. 11/803,973, filed on May 16, 2007.

(51) Int. Cl.
C03B 9/447    (2006.01)

(52) U.S. Cl. .......................................... 65/357; 65/227

(58) Field of Classification Search .................... 65/359, 65/360, 357, 361
See application file for complete search history.

(56) References Cited

U.S. PATENT DOCUMENTS

| | | | |
|---|---|---|---|
| 1,888,318 A | 11/1932 | Hofman | |
| 1,911,870 A | 5/1933 | Algeo et al. | |
| 1,975,050 A | 9/1934 | Peiler | |
| 2,262,432 A * | 11/1941 | Rodder et al. | 72/427 |
| 2,702,444 A | 2/1955 | Rowe | |
| 2,844,127 A * | 7/1958 | Steiner | 92/68 |
| 3,180,719 A | 4/1965 | Olson | |
| 3,180,720 A | 4/1965 | Kawecka | |
| 3,206,296 A | 9/1965 | Mennitt | |
| 3,528,796 A | 9/1970 | Trahan | |
| 3,591,358 A * | 7/1971 | Maul et al. | 65/360 |
| 3,798,019 A | 3/1974 | Bystrianyk et al. | |
| 4,043,254 A * | 8/1977 | Jaeger | 92/85 B |
| 4,375,979 A | 3/1983 | Newkirk et al. | |
| 4,826,524 A | 5/1989 | Foster | |
| 4,832,727 A * | 5/1989 | Libert | 65/357 |

(Continued)

FOREIGN PATENT DOCUMENTS

EP    0336566 A    10/1989

*Primary Examiner* — Matthew Daniels
*Assistant Examiner* — Yana Belyaev

(57) ABSTRACT

Apparatus for opening and closing mold arms in a glassware forming machine includes a gearbox for mounting on a glassware machine frame, a cylinder housing suspended beneath the gearbox, and a mold open/close cylinder disposed within the cylinder housing. The cylinder has a mold open/close piston with an extending piston rod and a gear rack machined or otherwise formed in the piston rod. A first drive gear in the cylinder housing is coupled to the gear rack and a drive shaft extends from the first drive gear and the cylinder housing into the gearbox. A second drive gear is disposed in the gearbox and coupled to the drive shaft. Laterally spaced operating shafts extend upwardly from within the gearbox. Means including an idler gear couple the second drive gear to the operating shafts such that the operating shafts are rotated simultaneously in opposite directions by the cylinder, the gear rack, the first and second drive gears and the idler gear. In exemplary embodiments of the disclosure, the means include driven gears or connecting links coupling the second drive gear and the idler gear to the operating shafts. Linkages couple the operating shafts to the mold arms of the glassware forming machine.

26 Claims, 21 Drawing Sheets

U.S. PATENT DOCUMENTS

| | | | |
|---|---|---|---|
| 5,019,147 A | 5/1991 | Voisine et al. | |
| 5,306,325 A * | 4/1994 | Smith et al. | 65/357 |
| 5,824,131 A | 10/1998 | Grant et al. | |
| 6,098,427 A * | 8/2000 | Kirkman | 65/261 |
| 6,557,380 B1 * | 5/2003 | DiFrank et al. | 65/359 |
| 6,684,665 B1 * | 2/2004 | Bogert et al. | 65/360 |
| 7,845,193 B2 * | 12/2010 | Cramer | 65/359 |
| 2004/0099012 A1 | 5/2004 | Bogert et al. | |
| 2006/0162383 A1 * | 7/2006 | Tijerina-Ramos et al. | 65/68 |
| 2008/0141718 A1 * | 6/2008 | Mohr | 65/260 |

* cited by examiner

APPARATUS FOR OPENING AND CLOSING MOLDS IN A GLASSWARE FORMING MACHINE

This application is a continuation-in-part of application 11/803,973 filed May 16, 2007.

The present disclosure relates to an apparatus for opening and closing the blank molds and/or the blow molds of a glassware forming machine.

BACKGROUND AND SUMMARY OF THE DISCLOSURE

Glassware forming machines, including particularly individual section glassware forming machines, include one or more blank molds for forming molten glass gobs into glass parisons, blow molds for blowing the glass parisons into articles of glassware such as glass containers, and transfer mechanisms for transferring the glass parisons from the blank molds to the blow molds and for transferring the articles of glassware from the blow molds. The blank molds and the blow molds typically are formed by mold halves mounted on mold arms for opening and closing the molds. A general object of the present disclosure is to provide an apparatus for opening and closing the blank molds and/or the blow molds of a glassware forming machine, which is easily serviced and thereby reduces machine downtime for maintenance and repair.

The present disclosure embodies a number of aspects that can be implemented separately from or in combination with each other.

Apparatus for opening and closing mold arms in a glassware forming machine, in accordance with one aspect of the present disclosure, includes a gearbox for mounting on a glassware machine frame, a cylinder housing suspended beneath the gearbox, and a mold open/close cylinder disposed within the cylinder housing. The cylinder has a mold open/close piston with an extending piston rod and a gear rack machined or otherwise formed in the piston rod. A first drive gear in the cylinder housing is coupled to the gear rack and a drive shaft extends from the first drive gear and the cylinder housing into the gearbox. A second drive gear is disposed in the gearbox and coupled to the drive shaft. Laterally spaced operating shafts extend upwardly from within the gearbox. Means including an idler gear couple the second drive gear to the operating shafts such that the operating shafts are rotated simultaneously in opposite directions by the mold open/close cylinder, the gear rack, the first and second drive gears and the idler gear. In exemplary embodiments of the disclosure, the means include driven gears or connecting links coupling the second drive gear and the idler gear to the operating shafts. Linkages couple the operating shafts to the mold arms of the glassware forming machine.

Apparatus for opening and closing mold arms in a glassware forming machine, in accordance with another aspect of the present disclosure, includes a gearbox for mounting on a glassware machine frame, a cylinder housing suspended beneath the gearbox, and a mold open/close cylinder disposed within the cylinder housing. The cylinder has a mold open/close piston with an extending piston rod and a gear rack machined or otherwise formed in the piston rod. Drive gears couple the gear rack to operating shafts on which the mold arms are mounted for moving the mold arms between open and closed positions. A mold close boost cylinder within the cylinder housing has a mold close boost piston operatively coupled to the piston rod and the gear rack. A mold close boost air supply on the cylinder housing supplies air to the boost cylinder and functions through the mold close boost piston, the piston rod and the gear rack to assist the mold open/close cylinder in holding the mold arms in the closed position. The mold close boost air supply preferably includes an exhaust valve for rapidly exhausting air from the mold close boost cylinder when the mold open/close cylinder moves the mold arms toward the open position. The mold close boost piston preferably is mounted on and end of the piston rod remote from the mold open/close piston.

BRIEF DESCRIPTION OF THE DRAWINGS

The disclosure, together with additional objects, features, advantages and aspects thereof, will best be understood from the following description, the appended claims and the accompanying drawings, in which:

DETAILED DESCRIPTION OF PREFERRED EMBODIMENTS

Figure 1:
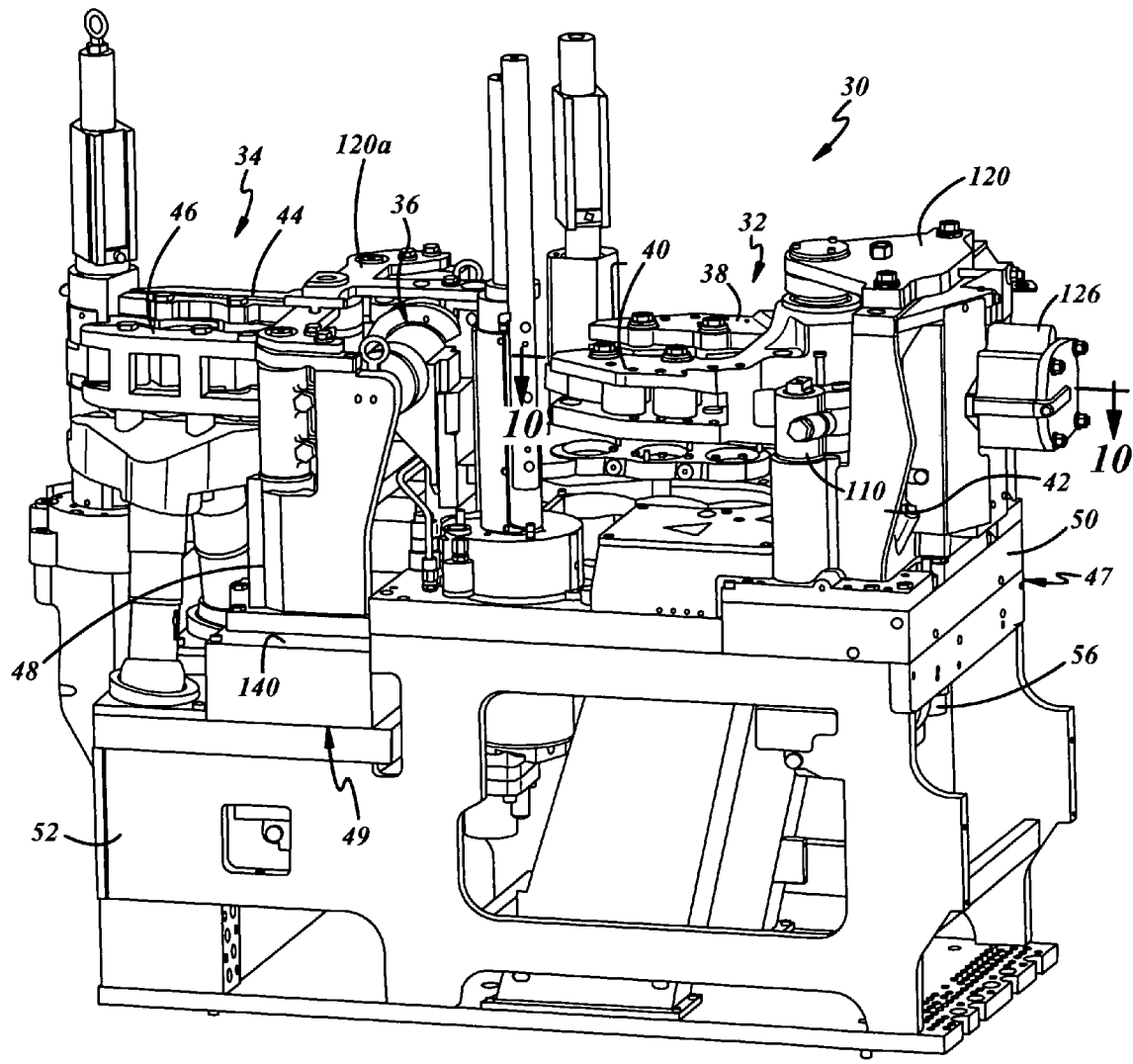
FIG. 1 is a side perspective view of a section of a glassware forming machine in accordance with an exemplary embodiment of the present disclosure.
Figure 2:
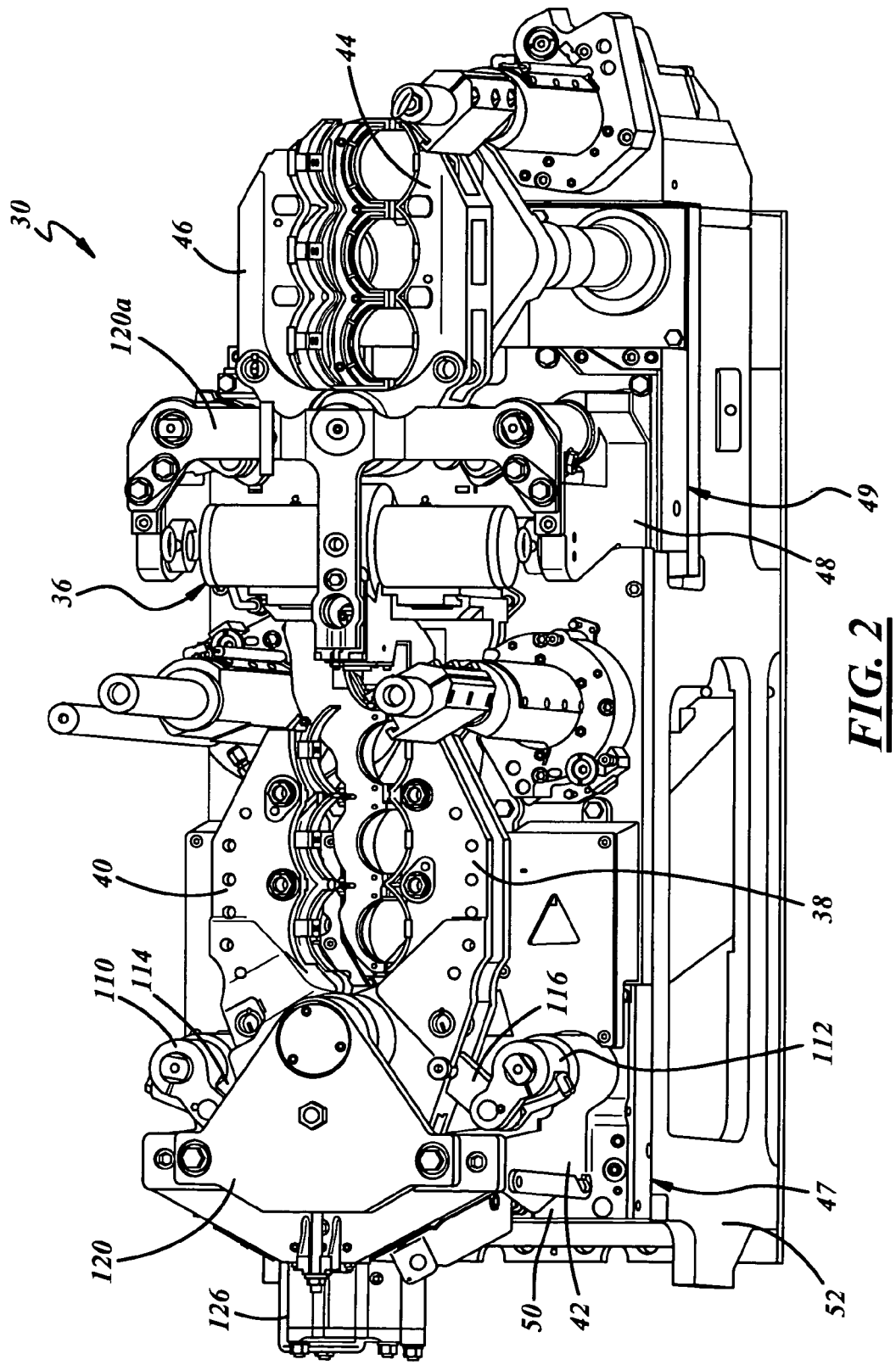
FIG. 2 is a top perspective view of the machine section in FIG. 1.

FIGS. 1 and 2 illustrate an exemplary section 30 of a glassware forming machine in which a mechanism for opening the blank molds and/or the blow molds can be implemented in accordance with the present disclosure. Machine section 30 generally includes a blank mold station 32, a blow mold station 34 and an invert arm assembly 36 for transferring glass parisons from the blank mold station to the blow mold station. Various devices that overlie the blank mold station and the blow mold station have been left out of FIGS. 1 and 2 for clarity. The blank mold station 32 preferably includes a pair of blank mold arms 38,40 mounted on a blank mold support bracket 42. Likewise, blow mold station 34 preferably includes a pair of mold arms 44,46 mounted on a blow mold support bracket 48. Blank mold station 32 and blow mold station 34, together with other transfer and operating mechanisms of machine sections 30, preferably are mounted on a section frame 52. Section frame can be enclosed to form a closed section box. Mechanisms 47, 49 for opening and closing the blank at blow molds are mounted under, preferably directly under, the blank mold and the blow mold support brackets 42, 48 respectively.

Figure 5:
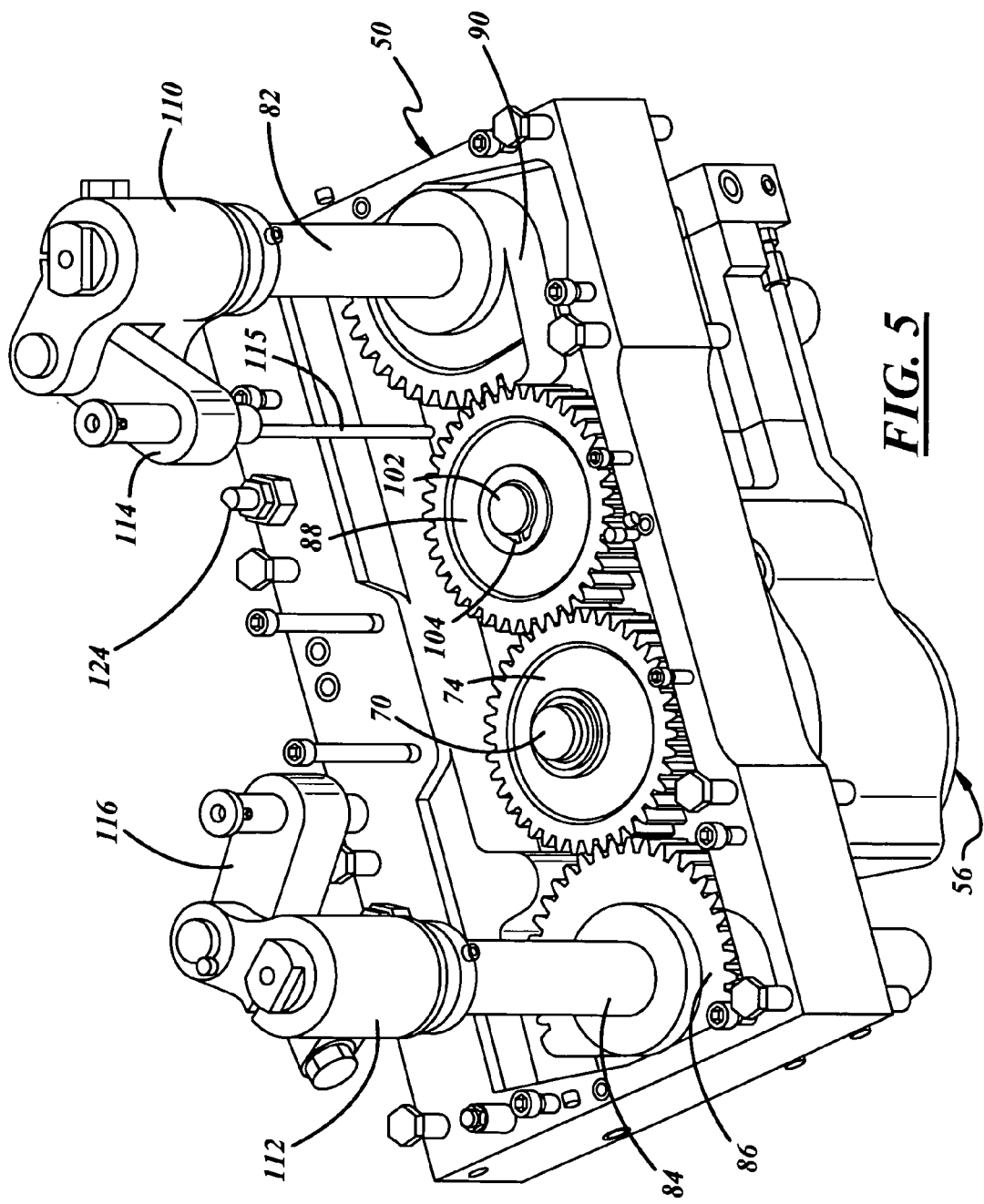
FIG. 5 is a perspective view of the mechanism of FIGS. 3 and 4 with the blank support bracket removed.
Figure 6:
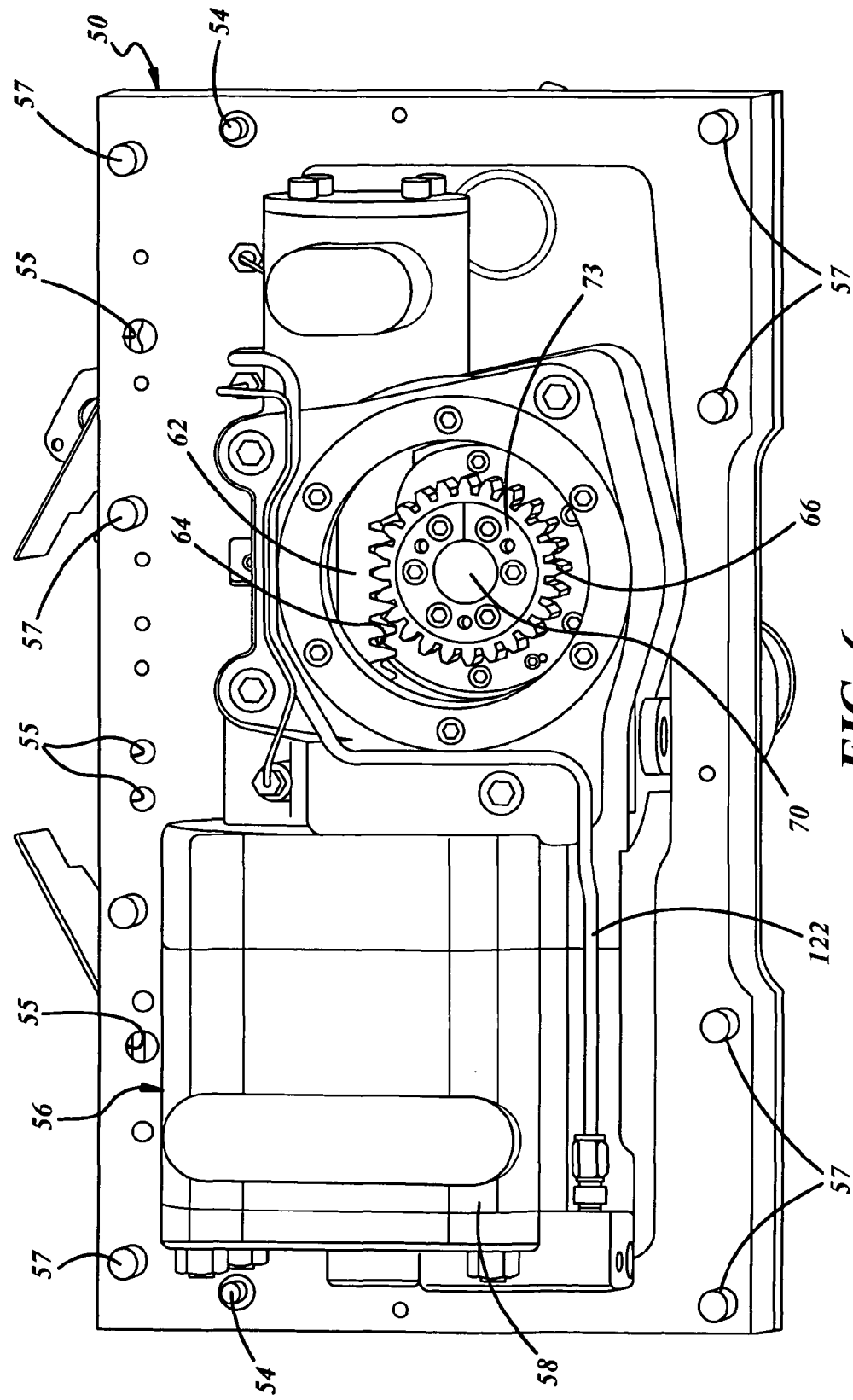
FIG. 6 is a perspective view of the underside of the mechanism in FIG. 5 with the cylinder housing cover removed.

Referring now to FIGS. 3-9, blank mold support bracket 42 is mounted on a gearbox 50, which in turn is mounted on the section frame 52. Gearbox 50 has parallel locating pins 54 for aligning gearbox 50 to section frame 52. Gearbox 50 is attached to section frame 52 by an array of fasteners 57. Gearbox 50 also has a plurality of ports 55 that align with corresponding ports on machine section frame 52 to feed operating air and fluid to mechanism 47. A cylinder housing 56 is suspended beneath gearbox 50. Within cylinder housing 56 there is an operating actuator 58. Actuator 58 can be an electrical actuator but preferably is a fluid actuator, most preferably a mold open/close air cylinder. Cylinder 58 has an internal mold open/close piston 60 with an axially extending piston rod 62. Gear teeth 64 (FIG. 6) are machined or otherwise formed in piston rod 62. A first drive gear 66 is disposed beneath a cylinder housing cover 68 (removed in FIG. 6) and has a peripheral array of gear teeth engaged with gear teeth 64 on piston rod 62. Gear teeth 64 thus forms a rack that drives gear 66. A drive shaft 70 extends from first drive gear 66 through the lower wall 72 of gearbox 50. First drive gear 66 preferably is coupled to drive shaft 70 by a locking hub 73. Within gearbox 50, a second drive gear 74 is mounted to drive shaft 70 and held thereon by a lock nut 75 or the like. A cavity composed of a pocket 76 (FIG. 8) is formed in a wall of cylinder housing 56 coaxially aligned with piston rod 62 and receives the end 78 of piston rod 62 in the fully open position of the blank mold arms. An annular seal 80 is disposed within pocket 76 and engages rod end 78 to form an air cushion, as will be described. Piston rod 62 preferably is supported by a gland seal 79 adjacent to cylinder 58 and by a sleeve bearing 81 on the opposing side of rack gear teeth 64 (FIG. 6).

Figure 5A:
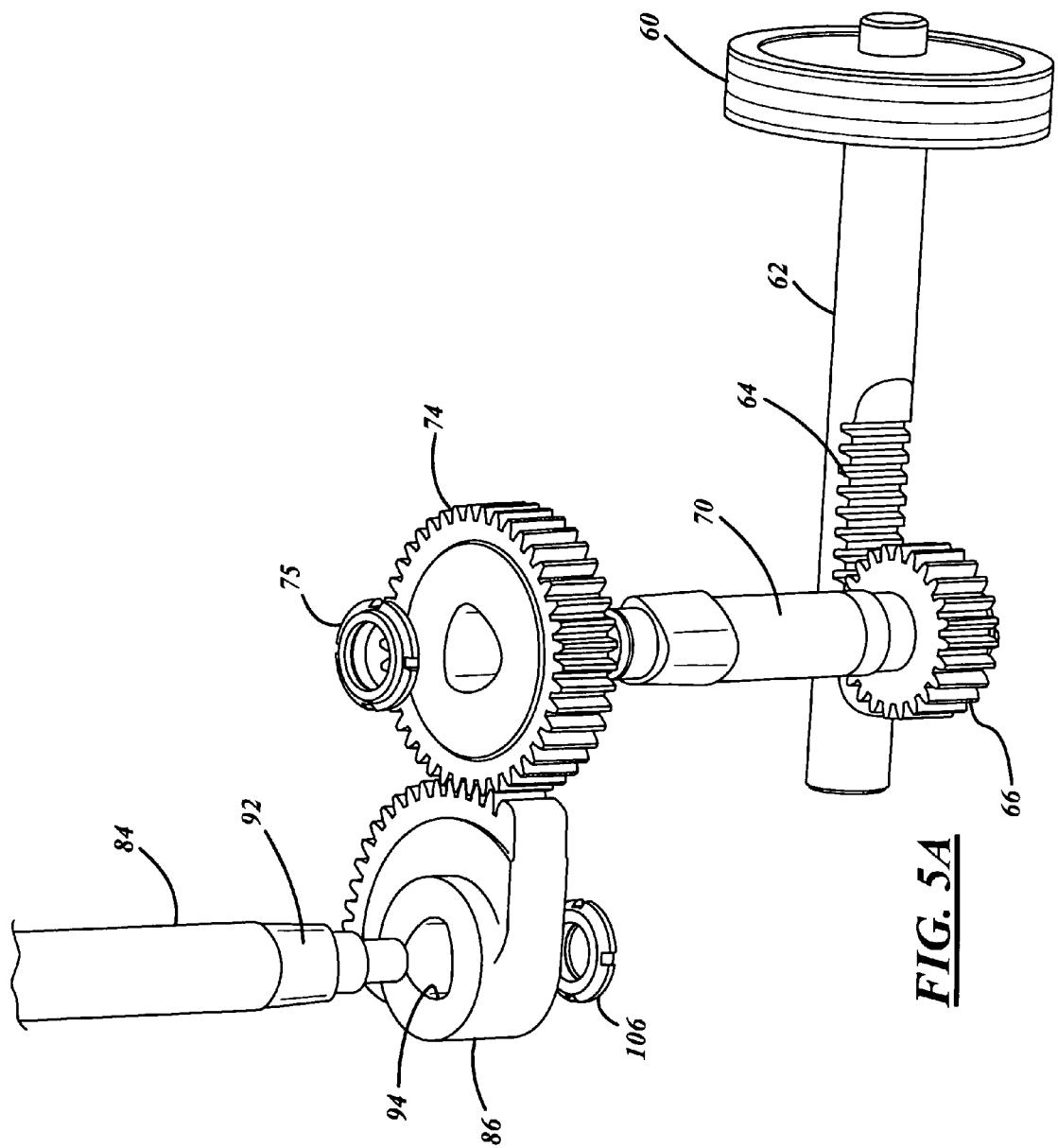
Figure 7:
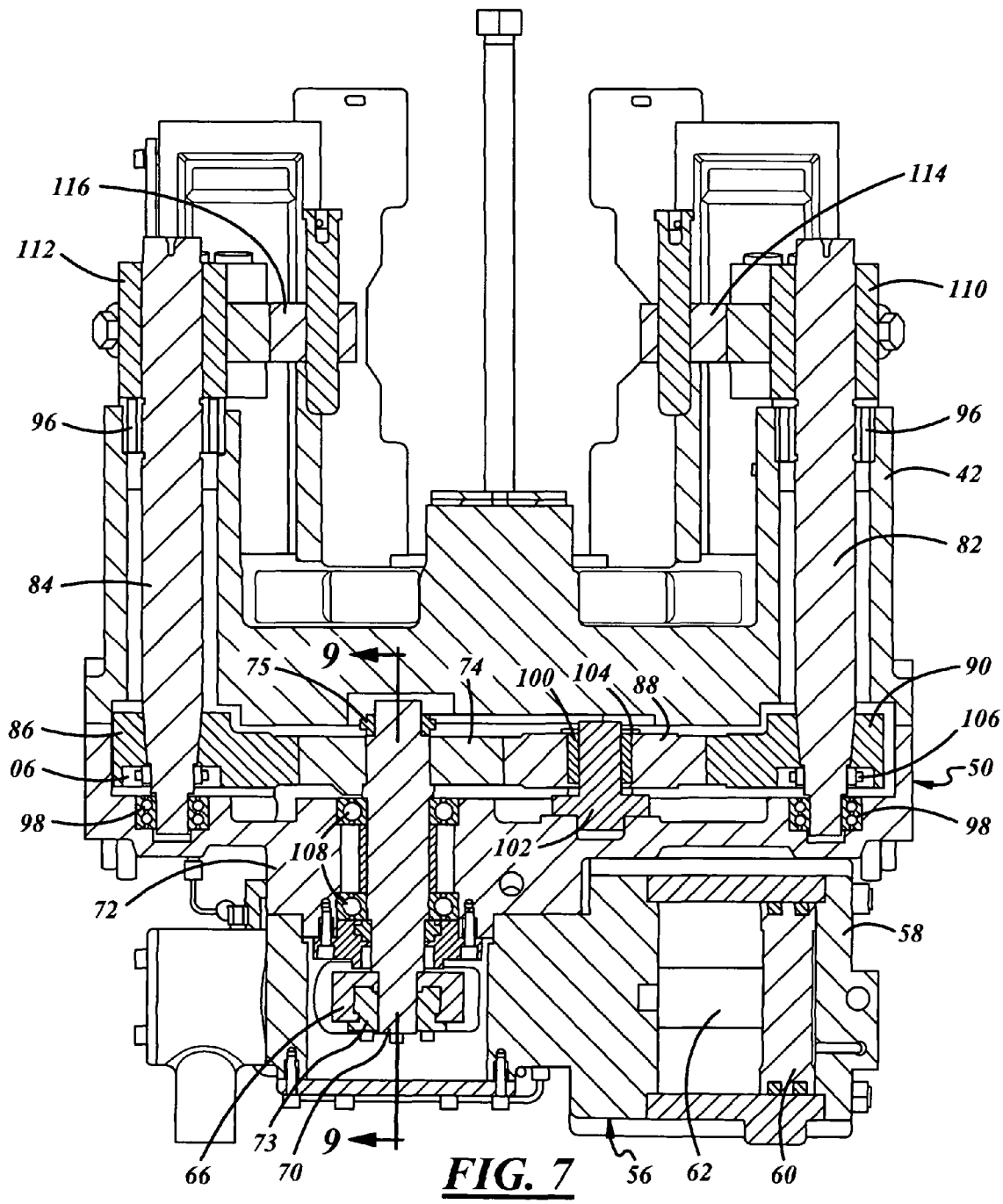
FIGS. 7 and 8 are sectional views taken substantially along the respective lines 7-7 and 8-8 in FIG. 3.
Figure 8:
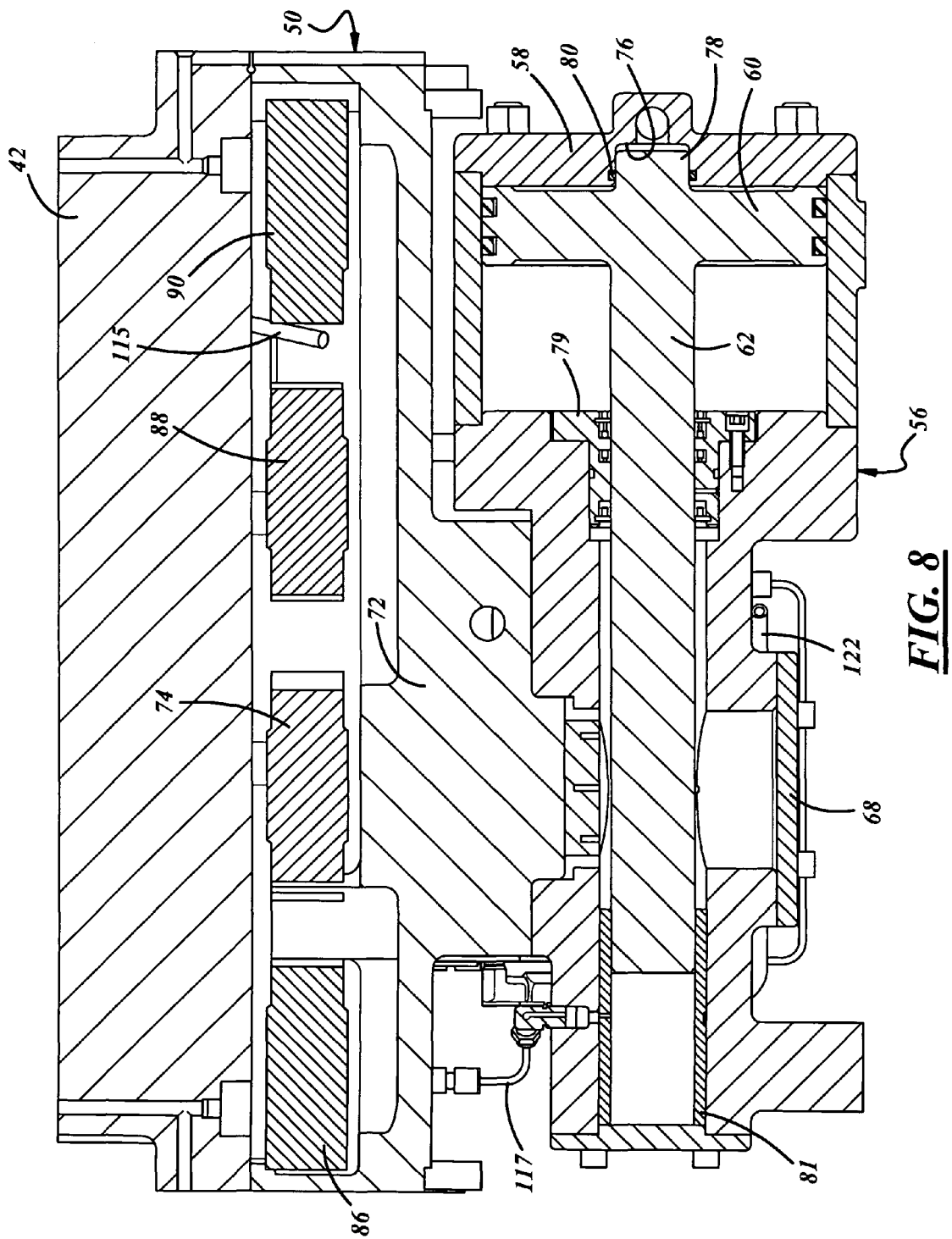
Figure 9:
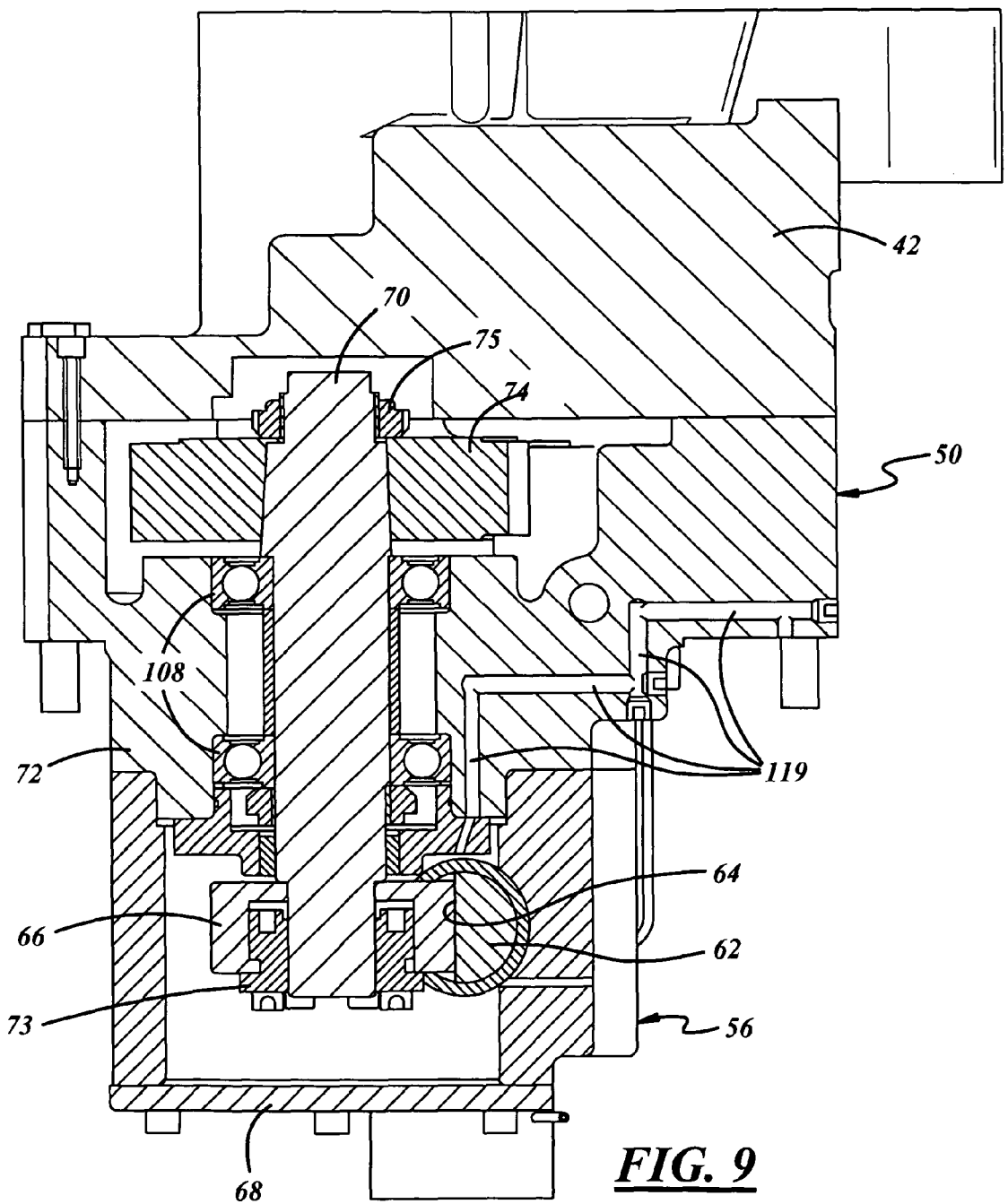
FIG. 9 is a sectional view taken substantially along the line 9-9 in FIG. 7.

A pair of operating shafts 82,84 (FIGS. 5 and 7) extend upwardly from the laterally opposed sides of gearbox 50. Operating shafts 82, 84 preferably are enclosed by corresponding portions of blank mold support bracket 42, as best seen in FIG. 7. Second drive gear 74 preferably is directly coupled to a gear 86, which in turn is coupled to the lower end of operating shaft 84. Second drive gear 74 also is coupled through an idler gear 88 to a gear 90 that is coupled to the lower end of operating shaft 82. Gears 86, 90 preferably are sector gears, as best seen in FIG. 5. Gears 86,90 preferably have alignment marks to ensure proper positioning during assembly. Shafts 70,82,84 preferably are coupled to gears 66,74,86,90 in such a way as to prevent backlash between the shafts and the gears. FIG. 5A shows that operating shaft 84 preferably has a tapered polygonal end 92 that is received within a correspondingly tapered polygonal center opening 94 in gear 86. Identical tapered polygonal couplings preferably are employed between operating shaft 82 and gear 90, and between drive shaft 70 and first and second drive gears 66,74, as best seen in FIG. 5A. Operating shaft 82 is supported by an upper bearing 96 carried by support bracket 42 and a roller bearing 98 disposed within gearbox 50. Operating shaft 84 also has support bearings 96,98. Idler gear 88 is rotatably supported by a bearing 100 received on a stub shaft 102 within gearbox 50 and may be secured to shaft 102 by a snap ring 104. Gears 90,86 preferably are secured to operating shafts 82,84 by lock nuts 106. Drive shaft 70 preferably is supported within gearbox wall 72 by spaced bearings 108. Levers 110,112 are coupled to the upper ends of operating shafts 82,84 for pivotal connection to blank mold arms 38,40 by means of links 114, 116. The interior of gear box 50 preferably is filled with lubricant, such as oil, to reduce gear wear. The oil level can be checked by a means of a dipstick 115 (FIGS. 5 and 8). A line 117 (FIG. 8) feeds lubricant to sleeve bearing 81 in cylinder housing 56. A passage 119 in wall 72 of gearbox 50 (FIG. 9) provides an inlet for feeding lubricant to the chamber within gearbox 50 surrounding rack gear teeth 64 (FIG. 6) and first drive gear 66.

Figure 3:
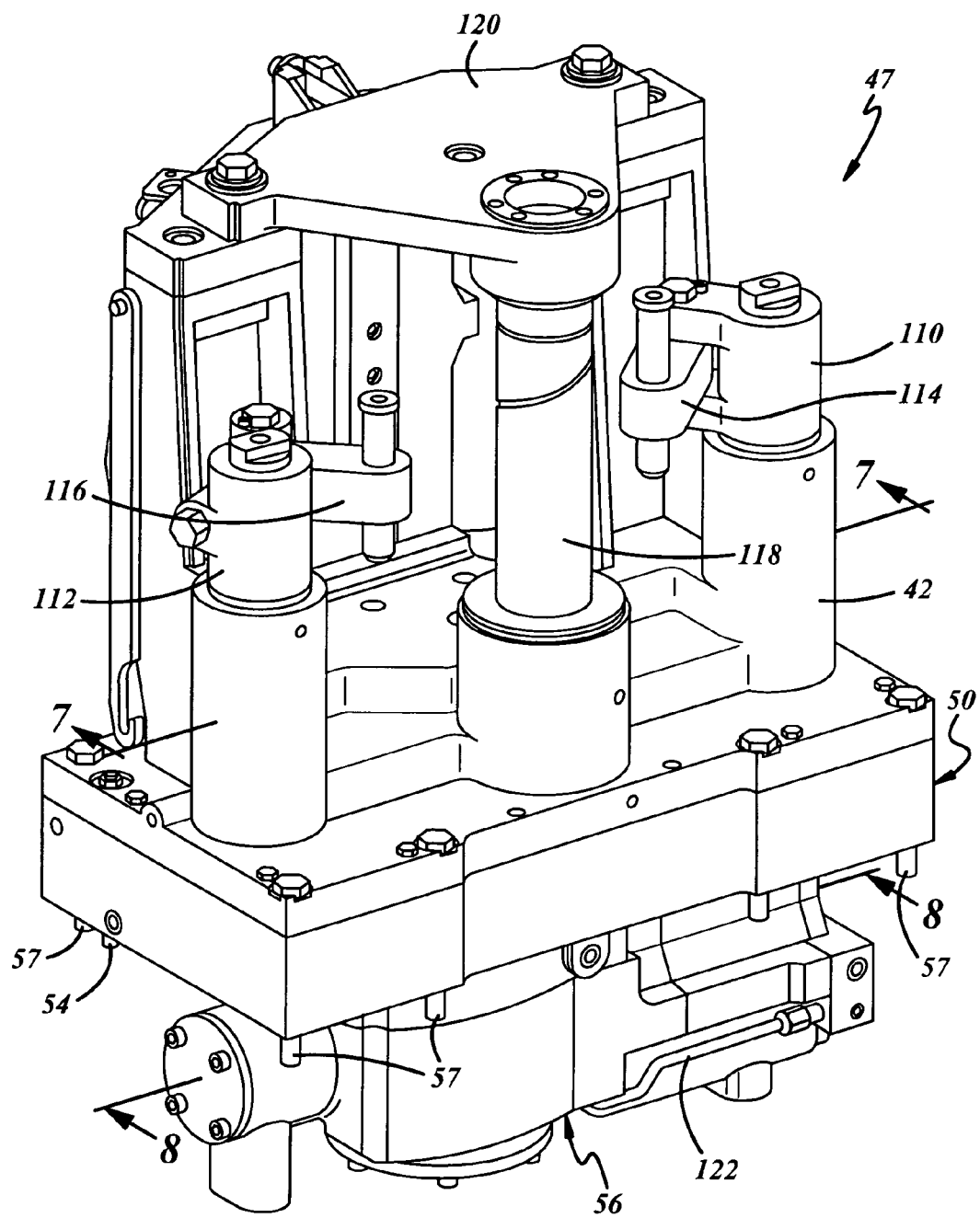
FIG. 3 is a front perspective view of the blank mold operating mechanism in the machine section of FIGS. 1 and 2 with the mold arms removed for clarity.
Figure 4:
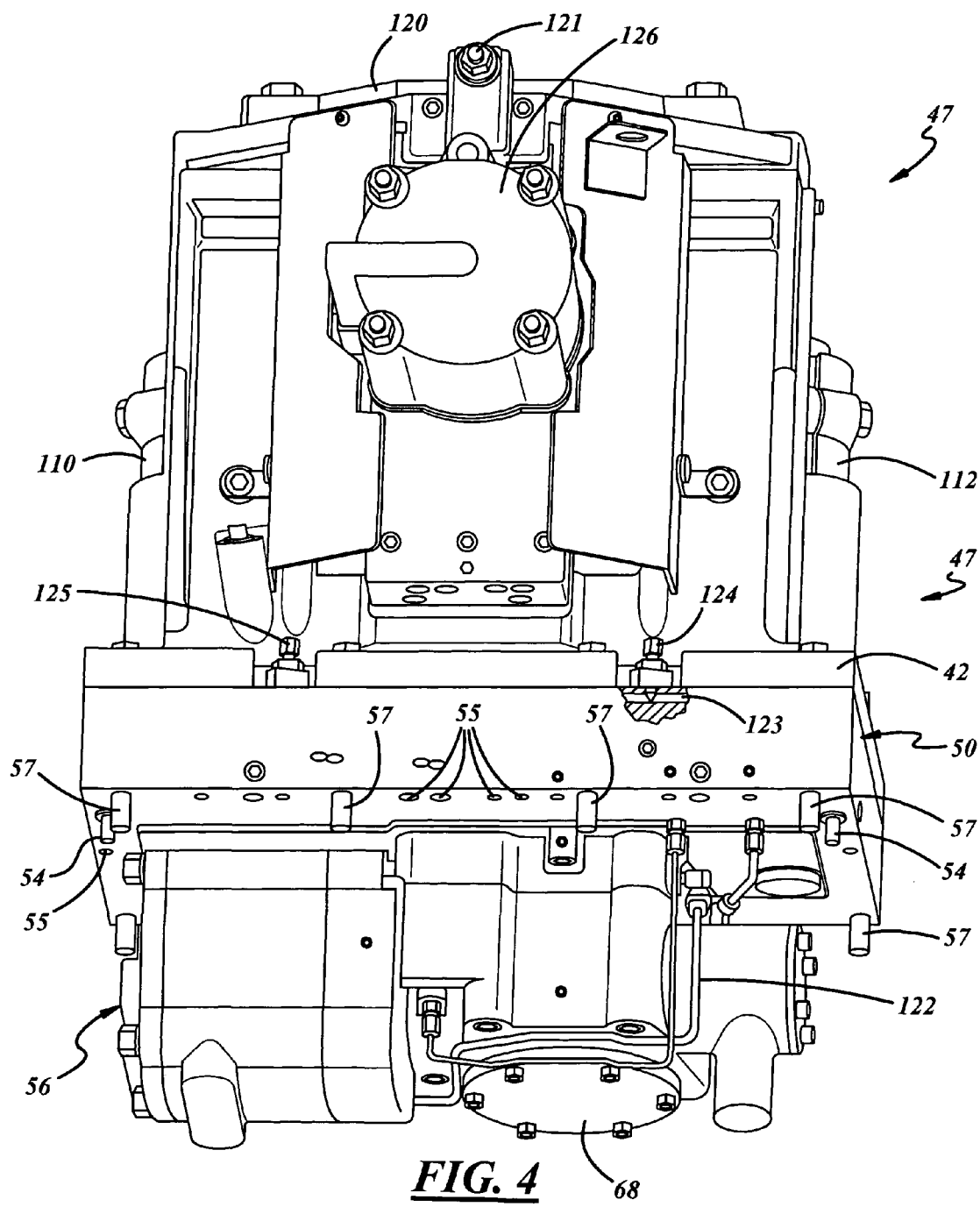
FIG. 4 is a rear perspective view of the blank mold operating mechanism of FIG. 3.
Figure 10:
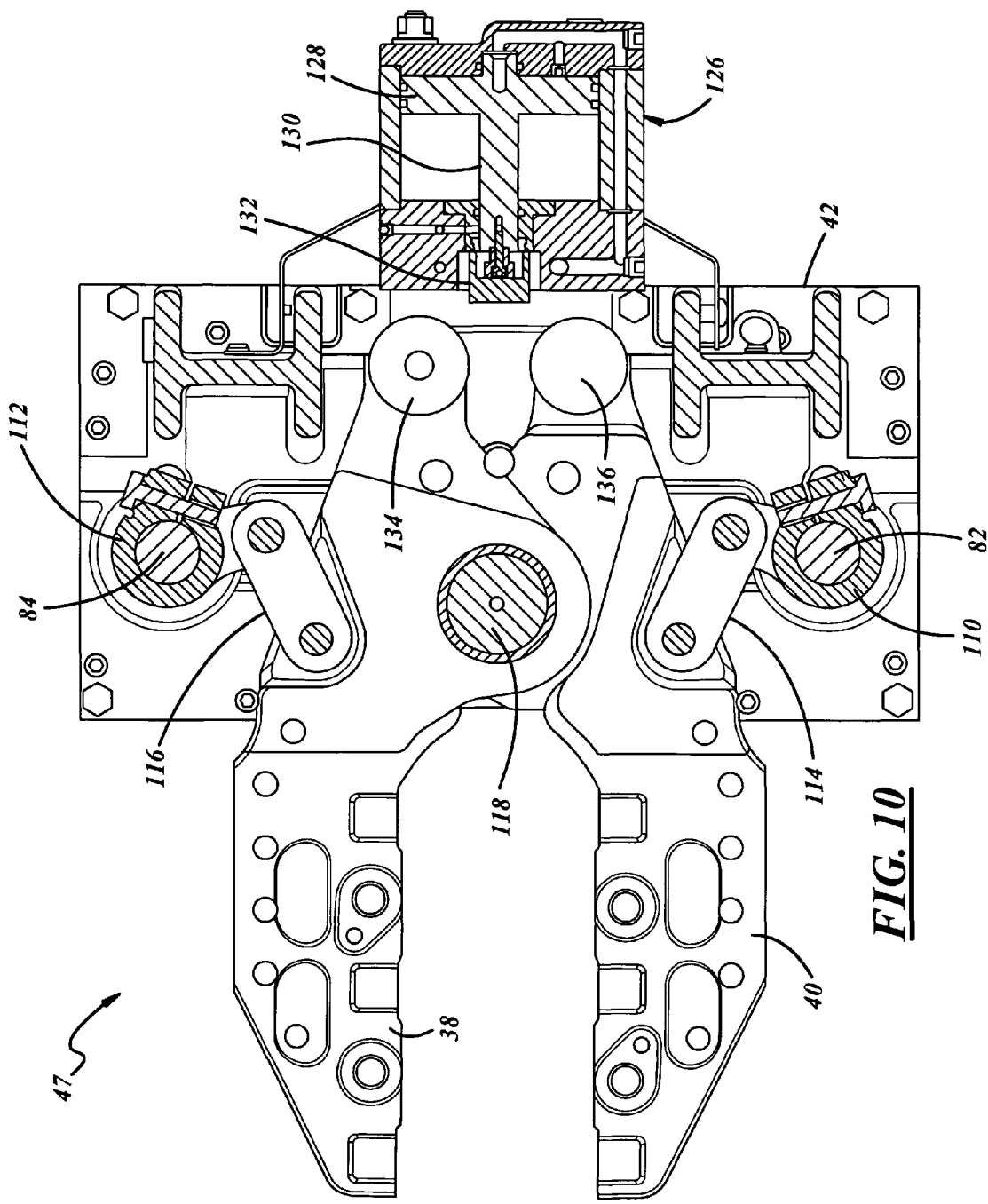
FIG. 10 is a partially sectioned view taken substantially along the line 10-10 in FIG. 1.
Figure 11:
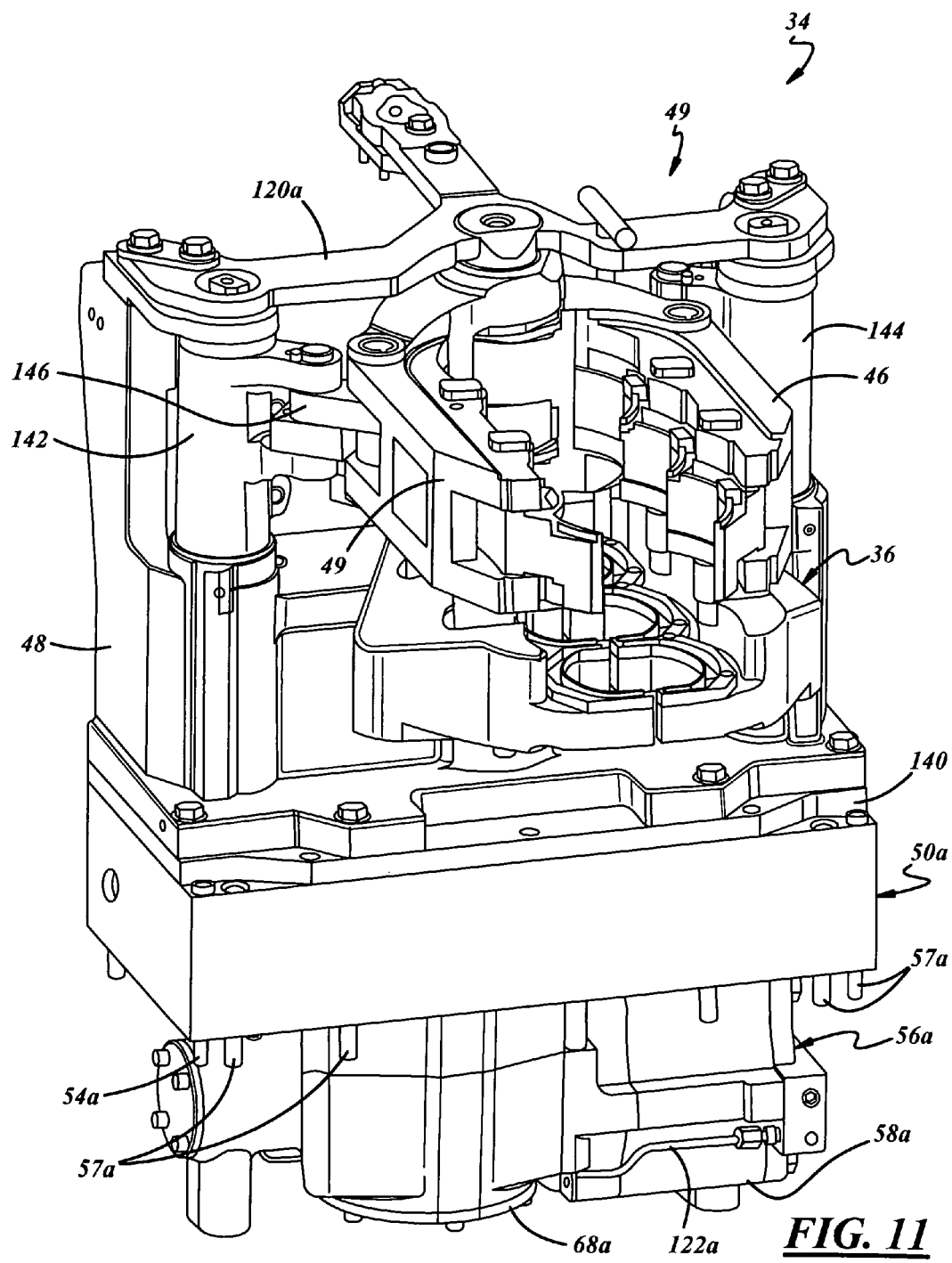
FIG. 11 is a front perspective view of the blow mold operating mechanism in the machine section of FIGS. 1 and 2.
Figure 12:
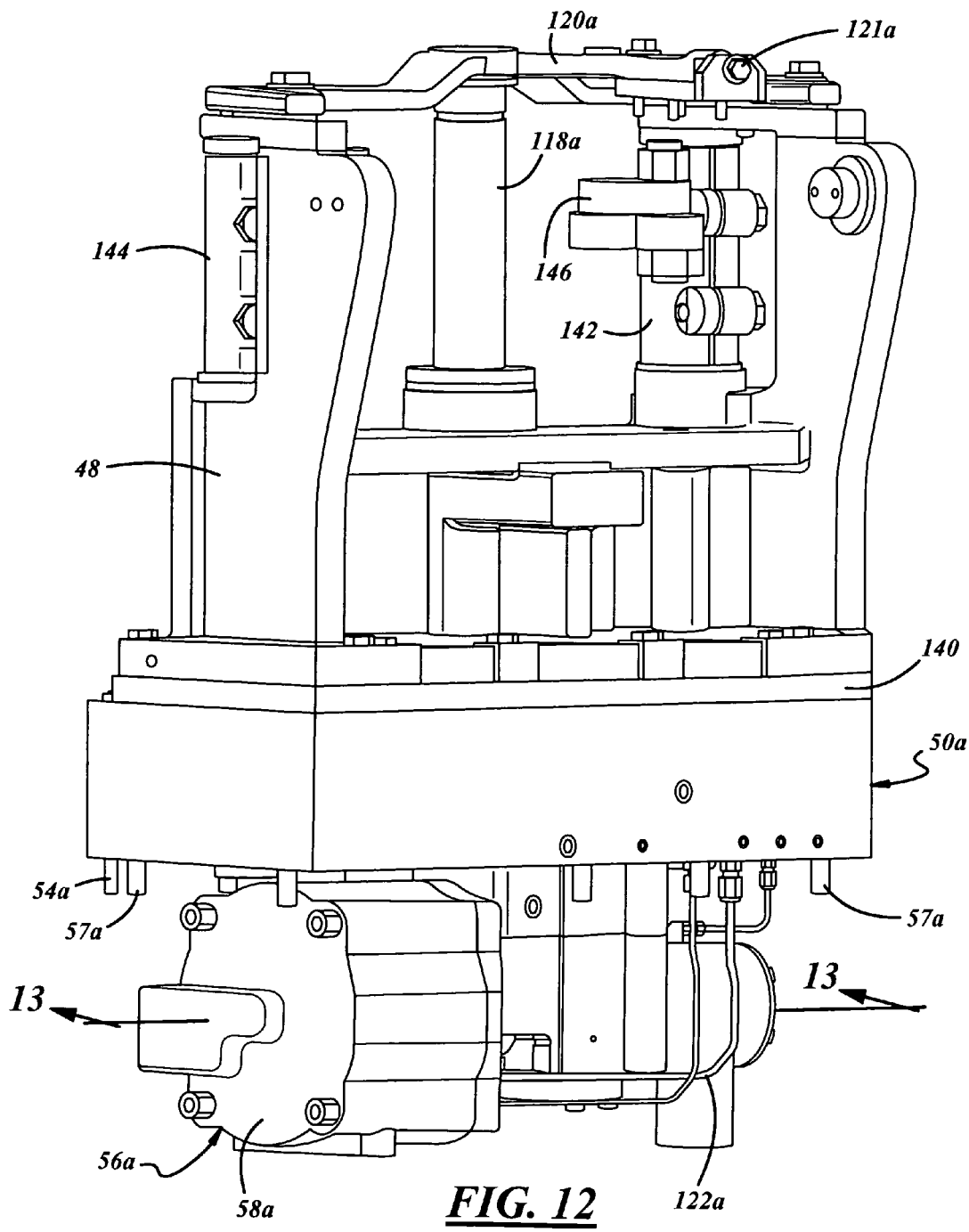
FIG. 12 is a rear perspective view of the blow mold operating mechanism in FIG. 11 with the mold arms removed.
Figure 13:
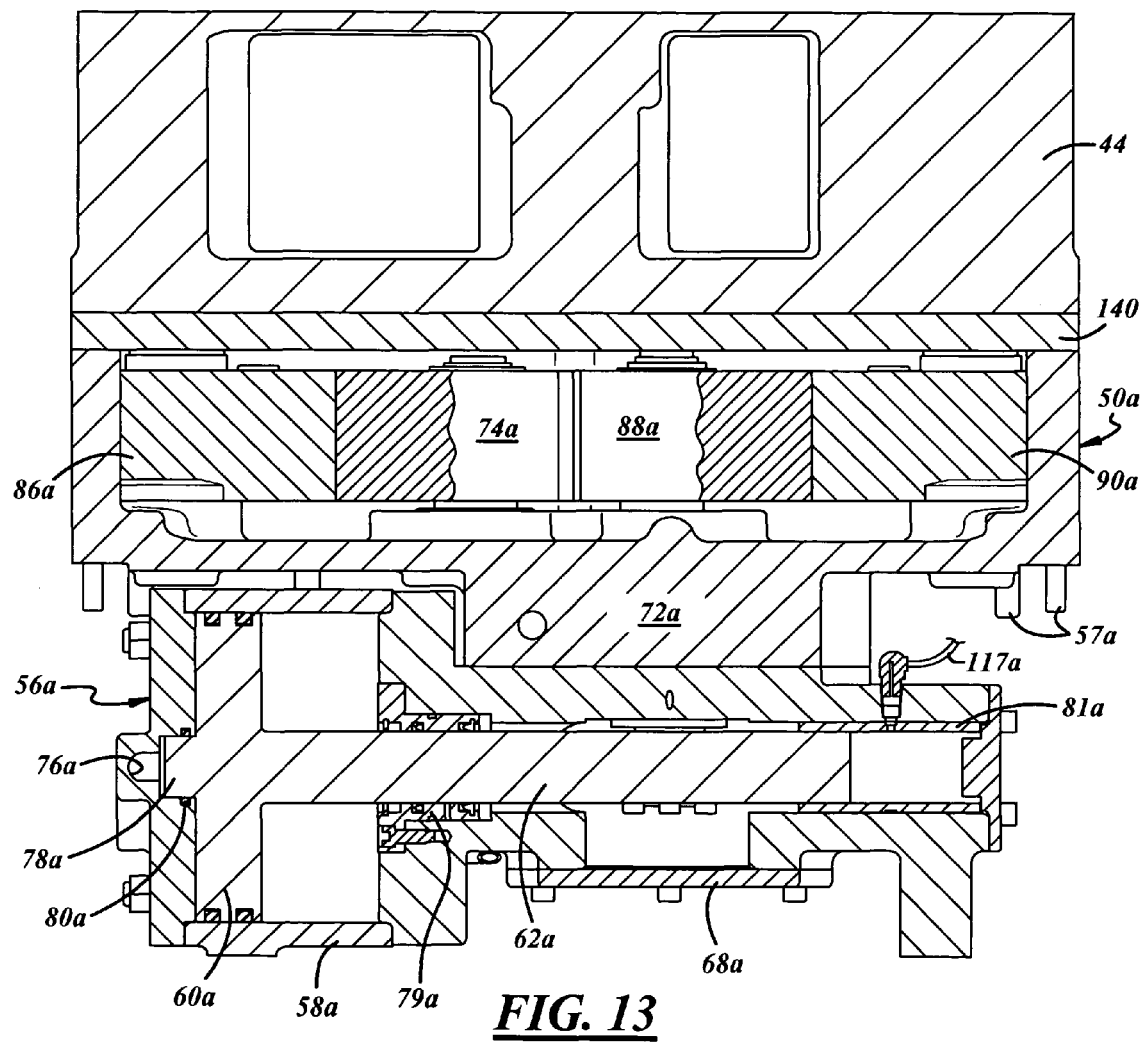
FIG. 13 is a sectional view taken substantially along the line 13-13 in FIG. 12.
Figure 14:
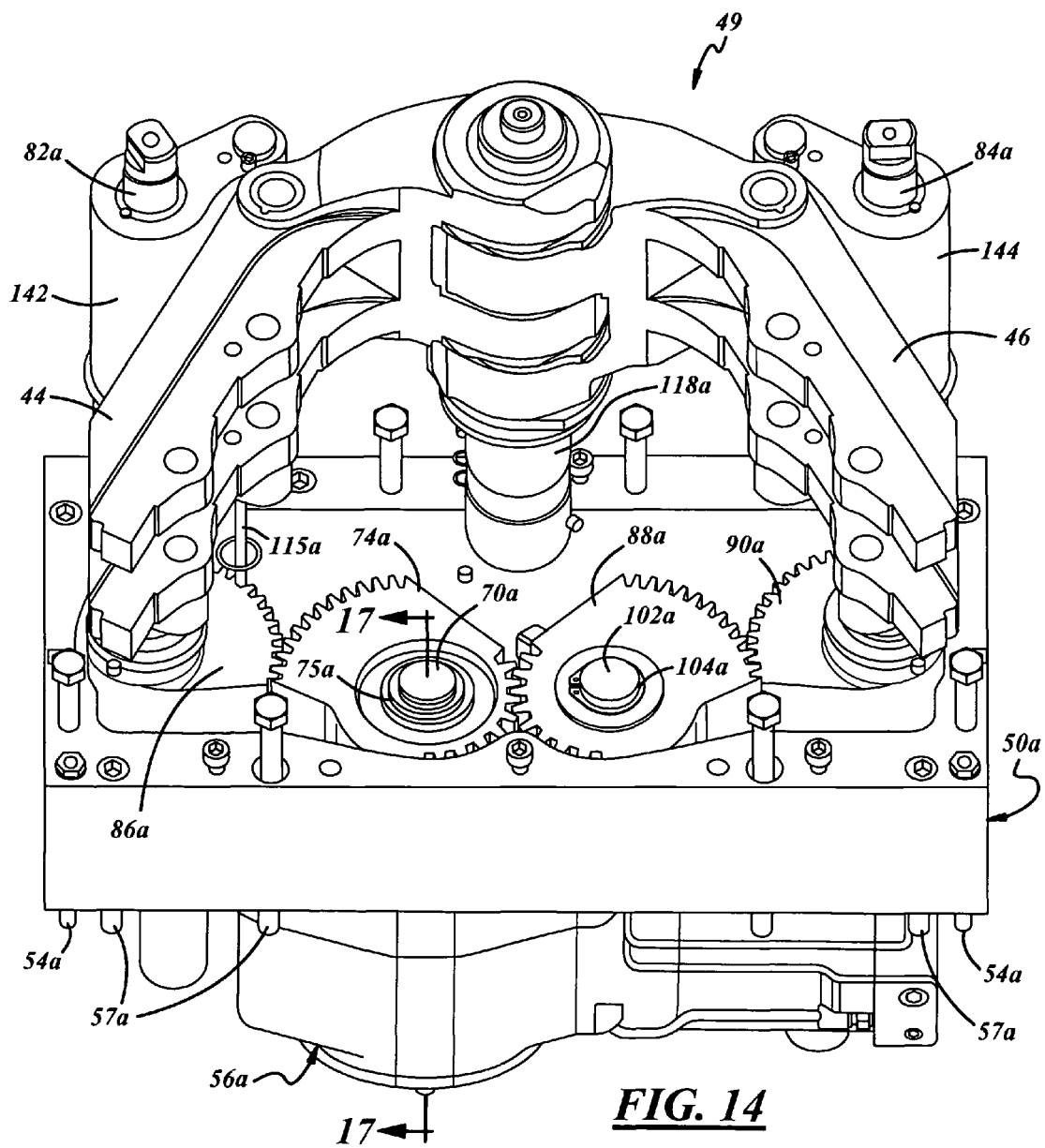
FIG. 14 is a perspective view of the blow mold operating mechanism in FIGS. 11 and 12 with the blow mold support bracket removed.
Figure 15:
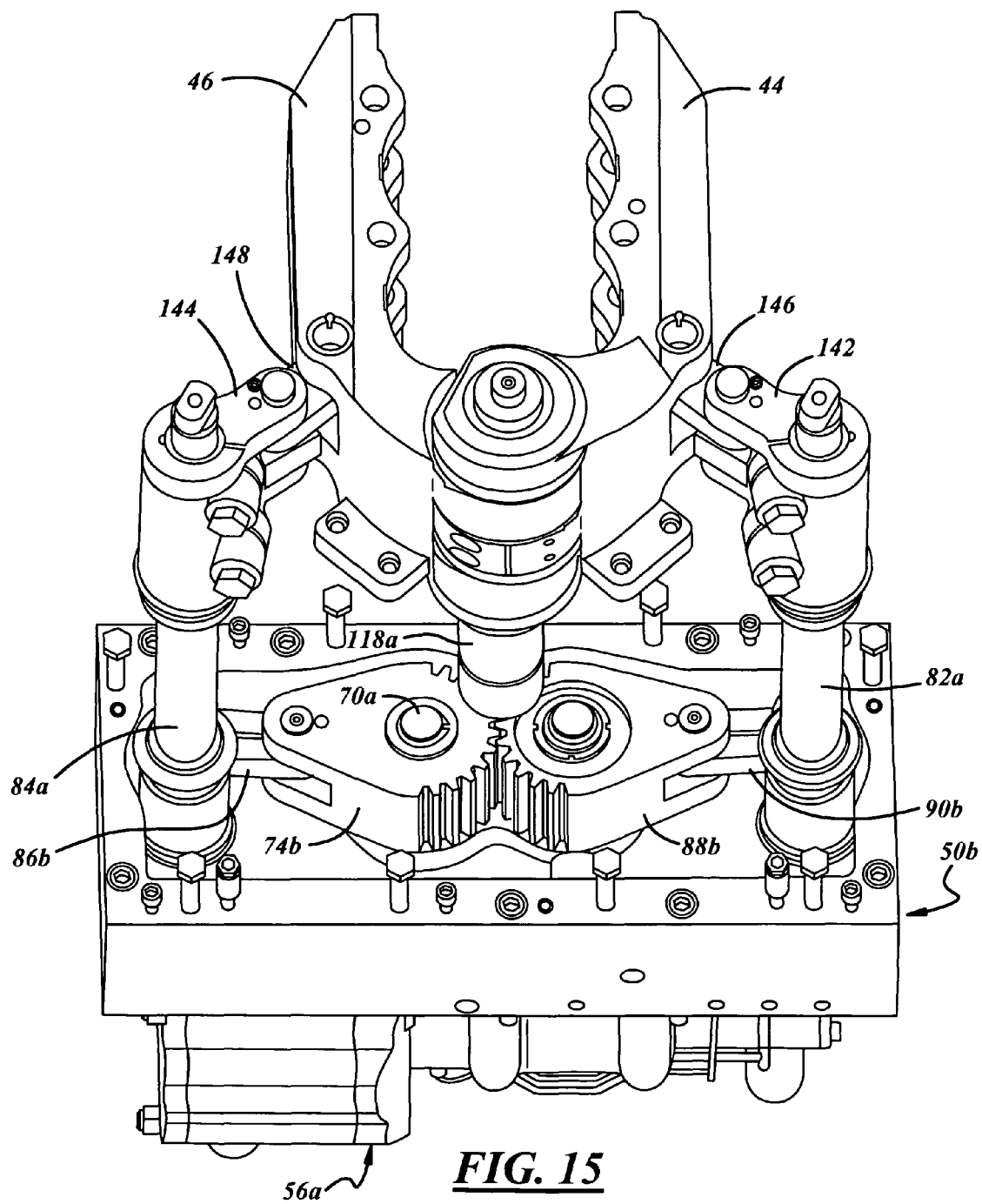
FIG. 15 is a rear perspective view of a blow mold operating mechanism in accordance with a modification to the embodiment of FIG. 14.

Thus, actuation of mold open/close piston 60 and piston rod 62 simultaneously rotates drive gears 66,74, rotates idler gear 88 in a direction opposite to drive gear 74, and rotates gears 90,86 and operating shafts 82,84 in respectively opposite directions. Operating shaft levers 110,112 and links 114, 116 are responsive to such rotation of operating shafts 82,84 to pivot blank mold arms 38,40 (FIGS. 1 and 2) in opposite directions. Blank mold arms 38,40 preferably are pivotally mounted on a mold arm hinge post 118 (FIGS. 3 and 10). Hinge post 118 has a lower end secured to blank mold support bracket 42 and an upper end received in and secured to an antideflection plate 120, which in turn is mounted on blank mold support bracket 42. With hinge post 118 secured at both ends, droop or sag of the mold arms is reduced or eliminated. Antideflection plate 120 can be adjusted by jackbolt 121 to adjust and remove droop or sag in the mold arms. Pocket 76 in cylinder housing 58 (FIG. 8) is connected by an air line 122 to an internal passage 123 in gearbox 50 that contains a needle valve screw 124 to control air flow. When end 78 of piston rod 62 enters pocket 76 during rightward motion in FIG. 8,—i.e., as the mold arms approach the fully open position—the air captured within pocket 76 cushions piston 60 at the end of its travel. A screw 124 (FIGS. 4 and 5) throttles flow of air from pocket 76 to modulate and control this cushioning effect. Needle valve screw 125 (FIG. 4) controls the cushion of the mold open cylinder An actuator, preferably an air cylinder 126 (FIGS. 1-2, 4 and 10), is mounted on blank mold support bracket 42. Air cylinder 126 has a piston 128 with a piston rod 130. A wedge block 132 is mounted on the end of piston rod 130 for receipt between rollers 134,136 on the ends of blank mold arms 38,40. With the blank mold arms in the fully closed position illustrated in FIG. 10, air cylinder 126 can be actuated to drive wedge block 132 between rollers 134,136 and thereby lock the mold arms (and the blank mold sections carried by the mold arms) in the closed position. The wedge block is retracted before the mold arms are opened by cylinder 58.

Figure 16:
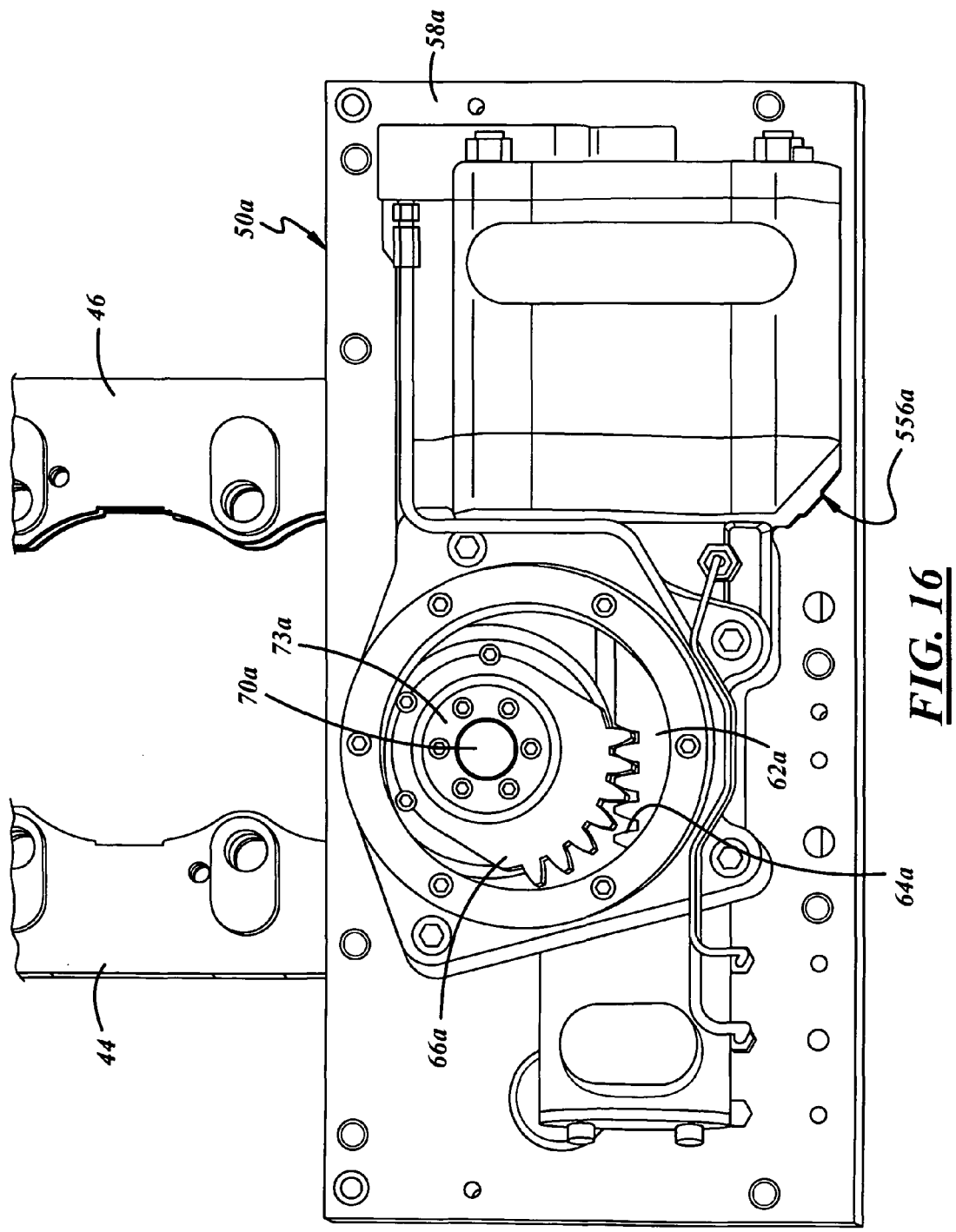
FIG. 16 is a bottom plan view of the blow mold operating mechanism with the cylinder housing cover removed.
Figure 17:
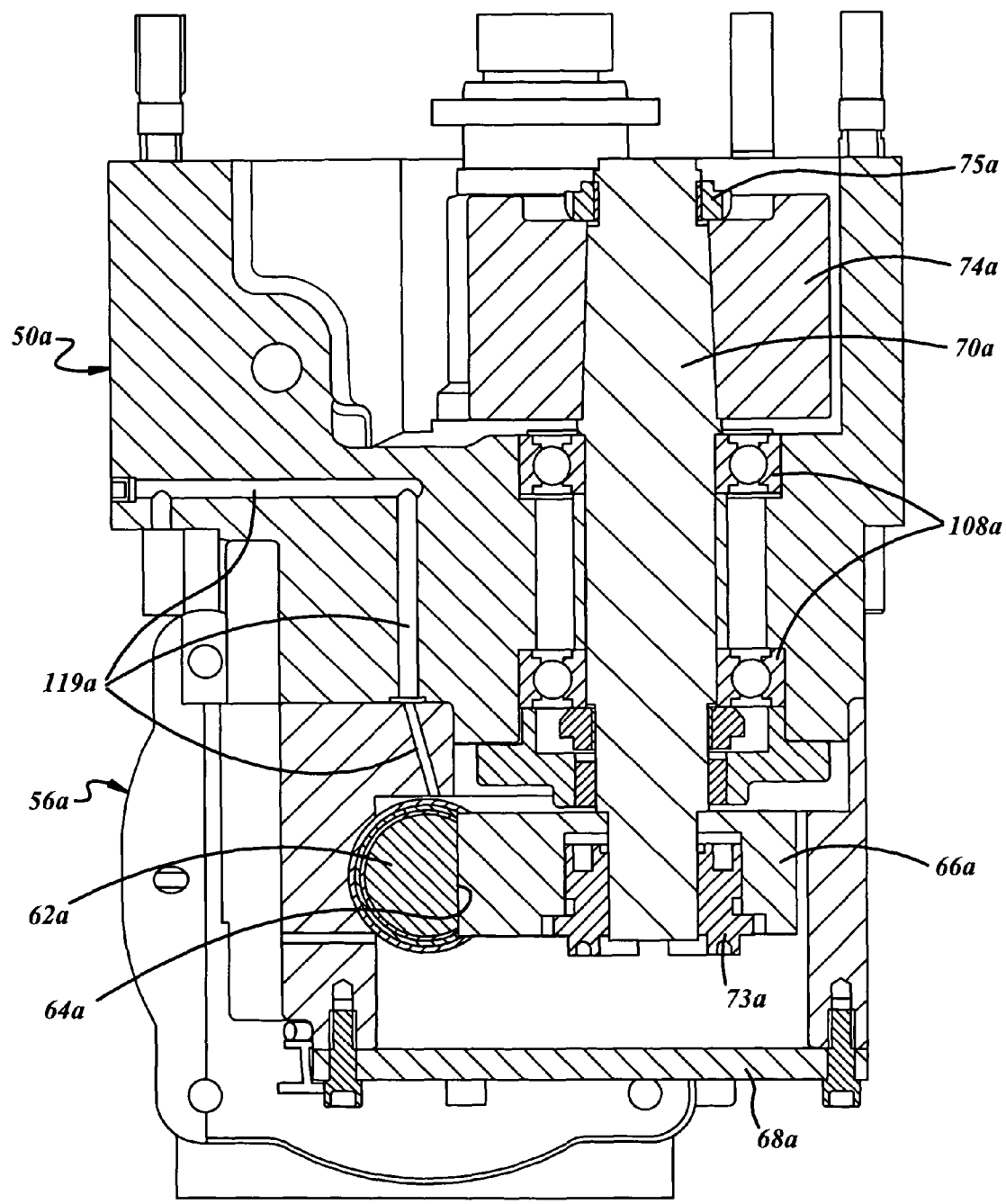
FIG. 17 is a sectional view taken substantially along the line 17-17 in FIG. 14.

FIGS. 11-17 illustrate the mechanism 49 for opening and closing the mold arms 44,46 at blow mold station 34. Mechanism 49 at the blow mold station is very similar to blank mold open/close mechanism 47 discussed in detail above, and corresponding elements are identified in FIGS. 11-17 by correspondingly identical reference numerals with the letter "a" or "b." Blow mold support bracket 48 is mounted on a gearbox 50a by means of a plate 140 (FIGS. 1, 11 and 12) to allow the blow mold support bracket to be disassembled from gearbox 50a. Cylinder housing 56a includes a piston 60a and a piston rod 62a with gear rack teeth 64a (FIG. 16) machined into rod 62a. First drive gear 66a, which preferably is a sector gear in FIG. 16, is coupled to a drive shaft 70a beneath a cover 68a. Within gearbox 50a, in the embodiment of FIG. 14, drive shaft 70a is coupled to a second drive gear 74a, which is directly coupled to a gear 86a coupled to an operating shaft 84a. Second drive gear 74 also is coupled through an idler gear 88a to a gear 90a coupled to operating shaft 82a. Gears 74a,86a,88a,90a preferably are sector gears in the embodiment of FIG. 14. In the alternative embodiment of FIG. 15, shaft 70a is coupled to a second drive gear 74b, which is coupled to operating shaft 84a by a link 86b. Second drive gear 74b also is coupled by an idler gear 88b and a link 90b to operating shaft 82a in the embodiment of FIG. 15. The upper ends of operating shafts 82a,84a are coupled by arms 142,144 and links 146,148 to blow mold arms 44,46 respectively. Thus, linear motion of piston 60a functions through piston rod gear rack teeth 64a, first drive gear 66a, drive shaft 70a, second drive gear 74a or 74b, idler gear 88a or 88b, and gears 86a,90a or links 86b,90b to rotate operating shafts 82a,84a in opposite directions, and thereby to open and close blow mold arms 44,46 (and the blow mold sections carried by the blow mold arms).

Figure 18:
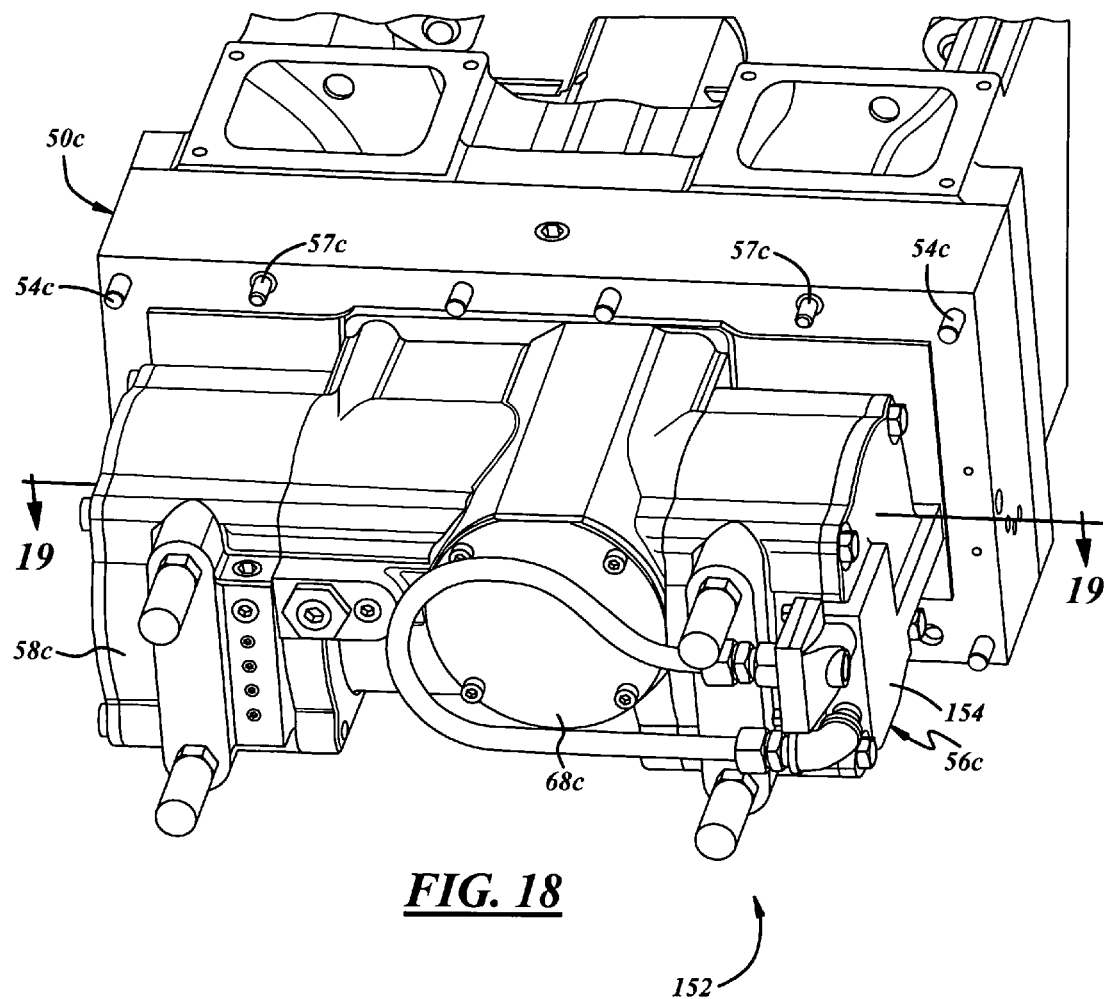
FIG. 18 is a fragmentary perspective view that is similar to the lower portion of FIG. 4 and illustrates a further exemplary embodiment of the present disclosure.
Figure 19:
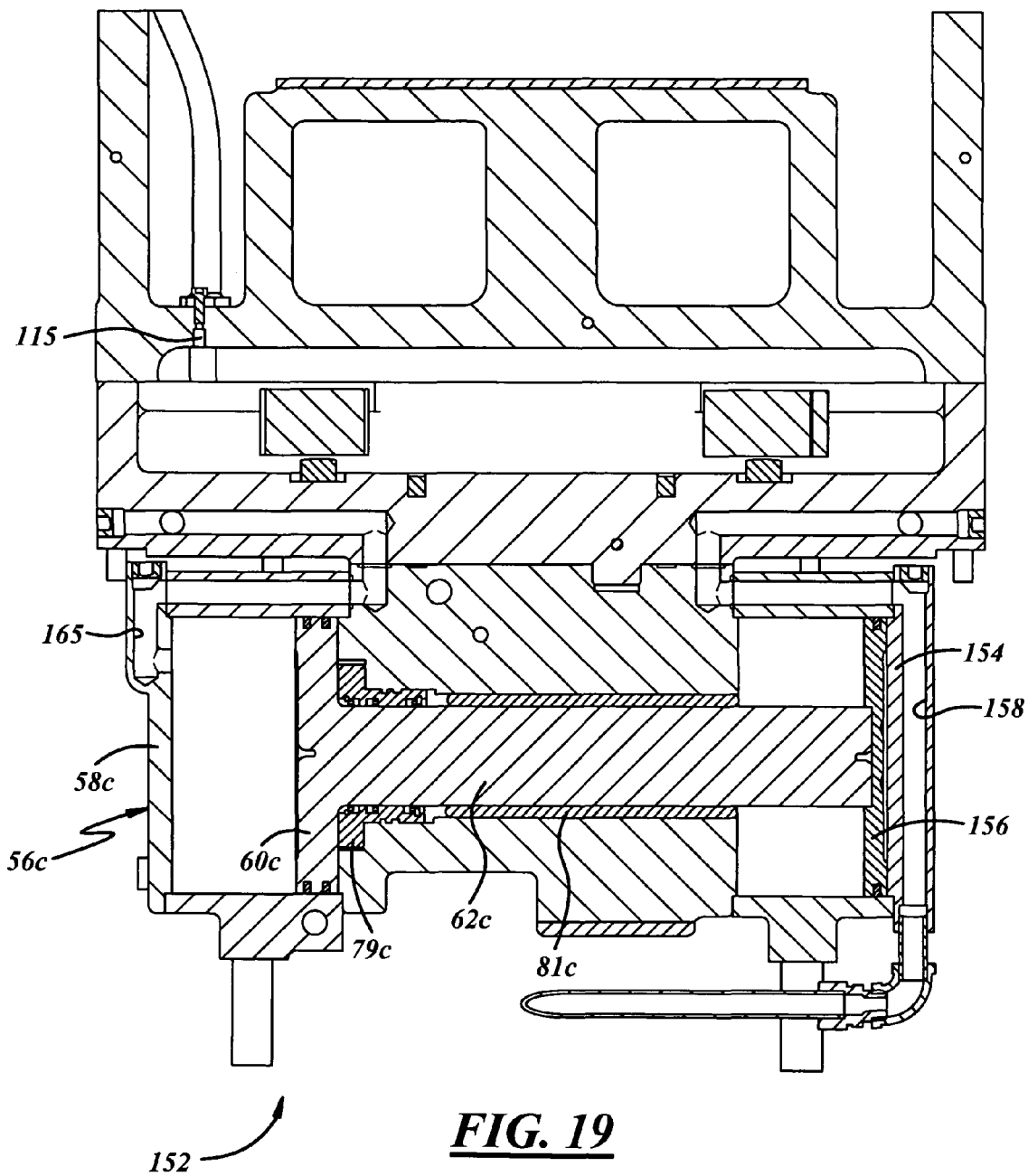
FIG. 19 is a sectional view taken substantially along the line 19-19 in FIG. 18.
Figure 20:
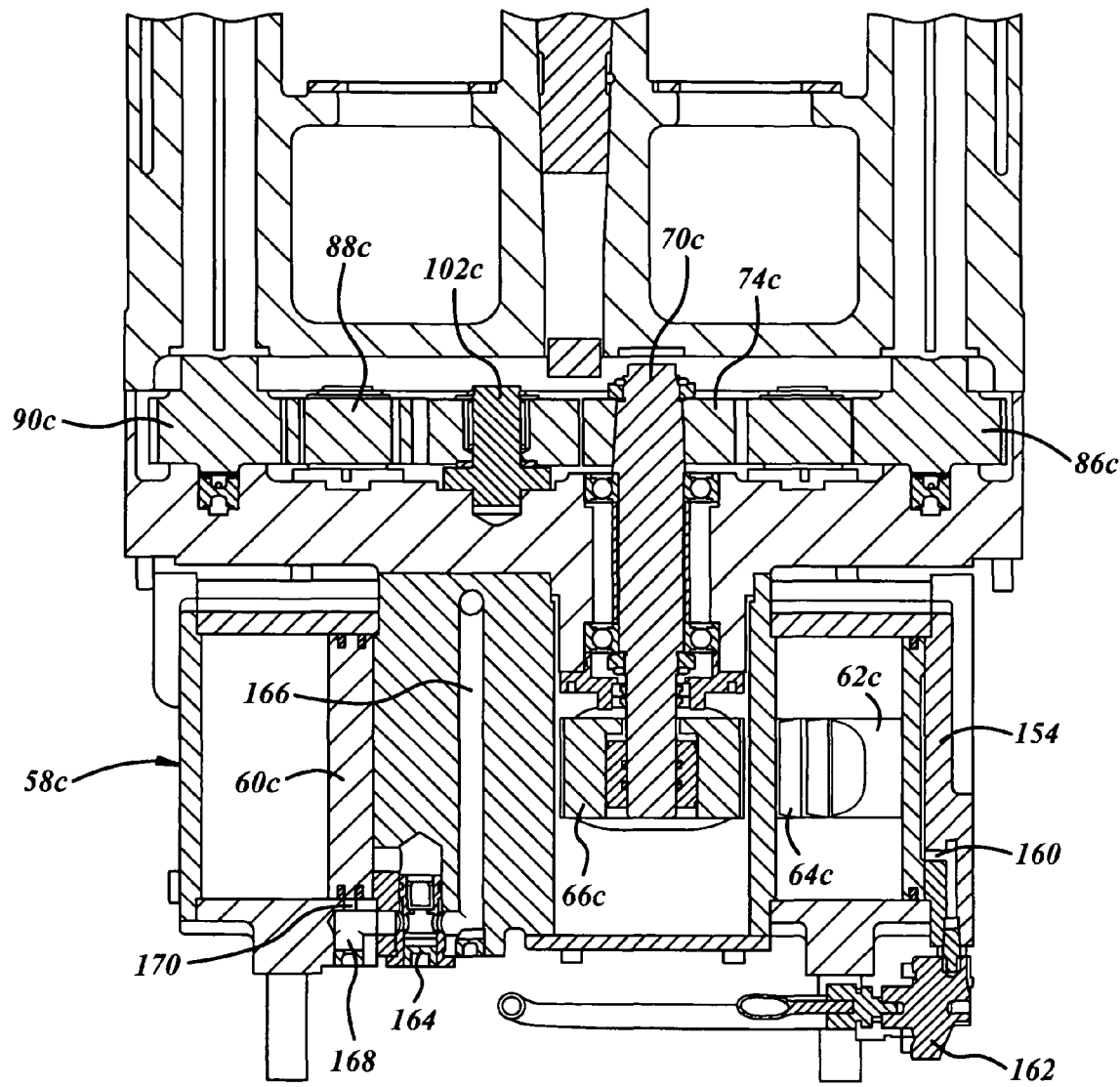
FIG. 20 is a sectional view of the embodiment of FIGS. 18-19 and is similar to the sectional view of FIG. 7.

FIGS. 18-20 illustrate a mechanism 152 that can be employed in place of mechanism 47 or mechanism 49 for opening and closing either the blank mold arms or the blow mold arms. The mechanism 152 of FIGS. 18-20, among other modifications, features a mold close boost cylinder 154 for assisting mold open/close cylinder 58c in holding the mold arms (and the mold sections carried by the mold arms) in the closed position. Mold open/close cylinder 58c preferably is the same as cylinder 58 in FIGS. 6-8 or 58a in FIGS. 11-13 and 16. Elements in FIGS. 18-20 that are similar to those discussed in connection with previous figures are identified by correspondingly identical reference numerals with the suffix "c."

Mold close boost cylinder 154 includes a mold close boost piston 156 that is operatively coupled to piston rod 62c and gear rack 64c, preferably by being mounted on the end of piston rod 62c remote from mold open/close piston 60c. Mold close boost operating air is fed by a passage 158 to the side of piston 156 remote from piston 60c. Whereas mold open/close piston 60c and cylinder 58c constitute a double-acting cylinder for both closing the mold arms (motion to the left in FIGS. 18-20) and opening the mold arms (motion to the right in FIGS. 18-20), mold close boost cylinder 154 is a single-acting cylinder that receives air only when the mold arms are fully closed to assist holding the mold arms in the closed position. The cavity of boost cylinder 154 is connected by a passage 160 (FIG. 20) to receive operating air through a quick-operating exhaust valve 162 for rapidly exhausting the mold close boost cylinder when the mold open/close cylinder begins moving the mold arms toward the open position. Cylinder 58c receives mold-open operating air through a passage 165 in housing 56c (FIG. 19).

Mechanism 152 illustrated in FIG. 20 also has a check valve assembly 164 for controlling passage of air from mold close operating air supply line 166 to cylinder 58c and piston 60c. A mold-open exhaust port 168 is connected by a passage 170 through the sidewall of cylinder 58c adjacent to the mold fully-open position of mold open/close piston 60c. As mold open/close cylinder 58c is moved in the opening direction, and is pushed out of passage 170 by piston 60c until passage 170 is blocked by piston 60c near the end of the piston stroke in the opening direction. When passage 170 is blocked, air is trapped within cylinder 58c and cooperates with piston 60c to cushion the motion of piston 60c and ultimately cushion the motion of the mold arms as the mold arms are moved to the fully open position. This cushion air is routed through a needle valve (screw 125 in FIG. 4) to control air flow and cushion the end of the operating stroke.

There thus has been disclosed an apparatus for opening and closing the mold arms in a glassware forming machine that fully satisfies all of the objects and aims previously set forth. The mold open/close mechanism can readily be removed from the machine section frame for maintenance or repair. There is substantial commonality of parts between the blank and blow mold operating mechanisms, and between operating mechanism for differing machine sizes. Provision of a mold close boost cylinder increases the closing force applied to the mold arms, and to the mold sections carried by the mold arms, without requiring an increase in operating air pressure. Although the mold close boost cylinder can be implemented at either blank mold station 32 (FIG. 1) or blow mold station 34, the boost cylinder preferably is employed at the blow mold station and is so illustrated in FIGS. 18-20. The disclosure has been presented in conjunction with several exemplary embodiments, and additional modifications and variations have been discussed. Other modifications and variations readily will suggest themselves to persons of ordinary skill in the art in view of the foregoing description. The disclosure is intended to embrace all such modifications and variations as fall within the spirit and broad scope of the appended claims.

The invention claimed is:

1. Apparatus for opening and closing mold arms in a glassware forming machine, which includes:
    a gearbox for mounting on a glassware machine frame,
    a cylinder housing suspended beneath said gearbox,
    a mold open/close cylinder disposed within said cylinder housing, said mold open/close cylinder having a mold open/close piston with an extending piston rod and a gear rack in said piston rod,
    a first drive gear in said cylinder housing coupled to said gear rack and to a drive shaft that extends from said first drive gear and said cylinder housing into said gearbox,
    a second drive gear disposed in said gearbox and coupled to said shaft,
    laterally spaced operating shafts extending upwardly from within said gearbox,
    means including an idler gear coupling said second drive gear to said operating shafts such that said operating shafts are rotated simultaneously in opposite directions by said cylinder through said piston rod, said first drive gear, said drive shaft, said second drive gear and said means including an idler gear,
    linkages for coupling said operating shafts to the mold arms of the glassware forming machine, and
    a mold close boost cylinder within said cylinder housing and having a mold close boost piston operatively coupled to said piston rod and said gear rack.

2. The apparatus set forth in claim 1 wherein said means include driven gears coupling said second drive gear and said idler gear to said operating shafts.

3. The apparatus set forth in claim 2 wherein said driven gears have tapered polygonal openings, and wherein said operating shafts have tapered polygonal ends received in said tapered polygonal openings of said driven gears.

4. The apparatus set forth in claim 2 wherein said driven gears are sector gears.

5. The apparatus set forth in claim 1 wherein said means include links coupling said second drive gear and said idler gear to said operating shafts.

6. The apparatus set forth in claim 1 wherein said idler gear and said second drive gear are sector gears.

7. The apparatus set forth in claim 1 wherein said first and second drive gears have tapered polygonal openings, and wherein said drive shaft has tapered polygonal ends received in said tapered polygonal openings of said first and second drive gears.

8. The apparatus set forth in claim 1 wherein said gearbox includes alignment means for mounting and aligning said gearbox on the glassware machine frame.

9. The apparatus set forth in claim 8 wherein said alignment means include an array of alignment pins extending around a periphery of said gearbox.

10. The apparatus set forth in claim 1 wherein said piston rod extends into a cavity in said cylinder housing, and wherein said apparatus includes an air passage extending from said cavity for limiting exhaust of air from said cavity and thereby cushioning motion of said piston.

11. The apparatus set forth in claim 10 wherein said cavity includes a pocket in a wall of said cylinder housing opposite an end of said piston rod and a seal around said pocket to engage an end of said piston rod.

12. The apparatus set forth in claim 11 including a screw on said gearbox extending into said air passage to throttle flow of air from said pocket.

13. The apparatus set forth in claim 1 including a mold support bracket mounted on said gearbox.

14. The apparatus set forth in claim 13 including a mold arm hinge post having one end coupled to said mold support bracket, and an antideflection bracket carried by said mold support bracket and coupled to a second end of said mold hinge post to prevent deflection of said mold hinge post.

15. The apparatus set forth in claim 13 including a lock cylinder mounted on said mold support bracket, said lock cylinder having a piston and an extending piston rod, and a lock wedge mounted on said piston rod for receipt between ends of mold arms mounted on said mold support bracket to lock the mold arms in a closed position.

16. The apparatus set forth in claim 1 including a mold close boost operating air supply on said cylinder housing for supplying air to said boost cylinder and functioning through said mold close boost piston, said piston rod and said gear rack to assist said mold open/close cylinder in holding the mold arms in a closed position.

17. The apparatus set forth in claim 16 wherein said mold close boost operating air supply includes an exhaust valve for rapidly exhausting air from said mold close boost cylinder when said mold open/close cylinder moves the mold arms toward an open position.

18. The apparatus set forth in claim 16 wherein said mold close boost piston is mounted on an end of said piston rod remote from said mold open/close piston.

19. The apparatus set forth in claim 1 wherein said mold open/close cylinder has an exhaust port in a sidewall of said cylinder housing that is covered by said mold open/close piston as the mold arms approach an open position such that air trapped in said mold open/close cylinder when said exhaust port is covered by said mold open/close piston cushions motion of said mold open/close piston.

20. Apparatus for opening and closing mold arms in a glassware forming machine, which includes:
a gearbox for mounting on a glassware machine frame,
a cylinder housing suspended beneath said gearbox,
a mold open/close cylinder disposed within said cylinder housing, said mold open/close cylinder having a mold open/close piston with an extending piston rod and a gear rack in said piston rod, wherein said mold open/close cylinder receives mold open operating air on one side of said mold open/close piston and said mold/open close cylinder receives mold close operating air on another side of said mold open/close piston,
drive gears coupling said gear rack to operating shafts for mounting the mold arms for rotating the operating shafts and thereby moving the mold arms between open and closed positions,
a mold close boost cylinder within said cylinder housing and having a mold close boost piston operatively coupled to said piston rod and said gear rack, and
a mold close boost operating air supply on said cylinder housing for supplying air to said boost cylinder and functioning through said mold close boost piston, said piston rod and said gear rack to assist said mold open/close cylinder in holding the mold arms in said closed position.

21. The apparatus set forth in claim 20 wherein said mold close boost operating air supply includes an exhaust valve for rapidly exhausting air from said mold close boost cylinder when said mold open/close cylinder moves the mold arms toward said open position.

22. The apparatus set forth in claim 20 wherein said mold close boost piston is mounted on an end of said piston rod remote from said mold open/close piston.

23. The apparatus set forth in claim 20 wherein a check valve assembly controls passage of air from a mold close operating air supply line to said mold open/close cylinder.

24. The apparatus set forth in claim 20 wherein a mold open exhaust passage communicates with said mold open/close cylinder adjacent to a mold open position of said mold open/close piston, wherein said mold open/close piston blocks said mold open exhaust passage when said mold open closed piston is near an end of its stroke in said opening direction.

25. The apparatus set forth in claim 24 wherein when said mold open exhaust passage is blocked, cushion air is trapped within said mold open/close cylinder and to cushion the end of the stroke of said mold open/close piston.

26. The apparatus set forth in claim 25 wherein said cushion air is muted through a needle valve to control air flow.

* * * * *